United States Patent [19]
Hirs

[11] 3,814,245
[45] June 4, 1974

[54] METHOD OF FILTERING

[75] Inventor: Gene Hirs, Birmingham, Mich.

[73] Assignee: Hydromation Filter Company, Livonia, Mich.

[22] Filed: Aug. 21, 1972

[21] Appl. No.: 282,518

[52] U.S. Cl............... 210/74, 210/80, 210/82, 210/279, 210/290
[51] Int. Cl............................................. B01d 41/02
[58] Field of Search....... 210/74, 80, 274, 275, 279, 210/290, 434

[56] References Cited
UNITED STATES PATENTS

| | | | |
|---|---|---|---|
| 2,773,829 | 12/1956 | Hunting | 210/35 |
| 3,550,774 | 12/1970 | Hirs et al. | 210/80 X |
| 3,680,701 | 8/1972 | Holca | 210/80 |

*Primary Examiner*—Samih N. Zaharna
*Assistant Examiner*—Robert G. Mukai
*Attorney, Agent, or Firm*—Cullen, Settle, Sloman & Cantor

[57] ABSTRACT

A liquid filtering method for operating an apparatus comprising a deep bed of dual, vertically separate, granular filter media beds. The first filter media bed has relatively coarse, light grains, e.g. in a size range of 0.050 to 0.375 inches and having a specific gravity in the range of 0.9 to 1.6. The second filter media bed, which underlies the first bed, has finer, heavier grains which have a specific gravity greater than 2.1. During filtration, after flow downwardly through the first bed, a substantial portion of the partially filtered liquid is intercepted and directed upwardly through the second bed to a clean liquid outlet located within the depth of the second bed. The remainder of the partially filtered liquid continues to flow downwardly into and through the second bed to the same outlet. Upon backwashing, the first bed is slurried and turbulently recirculated through a path external of the retaining vessel, while the second bed is only expanded. After backwashing, the filter media beds assume their original respective orientations.

4 Claims, 3 Drawing Figures

METHOD OF FILTERING

CROSS REFERENCE TO RELATED APPLICATION

This application includes subject matter generally related to that disclosed in this applicant's Ser. No. 282,520 for U.S. patent, filed Aug. 21, 1972.

BACKGROUND OF INVENTION

Filtration through a bed of granular filter media to remove particulate contaminants from a liquid is most efficiently accomplished by forming the filter bed into gradations of larger to smaller granular filter media in the direction of filtration flow. This large-to-small gradation allows surface loading contaminants — fibrous and lint-like material, flakes, hydroxides, greases and oils and the like — to penetrate the surface of the filter bed to become entrapped within the interstices of the relatively large filter media. Thus, surface loading is avoided. The smaller particulate contaminants pass through the bed of large media and are entrapped by the filter bed comprised of finer granules. A description of such graded media and its advantages is set forth in U.S. Pat. No. 3,276,585.

Absent such a gradation, in-depth filtration utilizing a uniformly mixed filter bed of fine and large granules would experience very short filtration cycles. The fibrous and lint-like particulates and other surface loading contaminants would quickly blind off the surface of such a filter bed minimizing or eliminating the efficiencies of in-depth filtration.

However, simply forming a graded bed of filter media as called for above is not the entire answer to the problems encountered in repeated operations. If a bed of filter media, graded from large to small granules, is comprised of material of a uniform specific gravity, backwashing of the filter bed after a filtration cycle will either uniformly mix the various sized filter media, or if the backwashing is turbulent, will cause the filter media to become graded and classified in an order of fine to coarse media, which is precisely the reverse of the desired order of gradation.

To overcome the difficulties encountered in utilizing filter media of a uniform specific gravity, numerous mixed-media in-depth filtration methods and apparatus have been proposed and patented. The larger granule filter bed of a mixed-media filter has a specific gravity which is less than that of the finer granule filter media. Differentials in the specific gravity of the different filter media permit the desired gradation to be maintained after numerous backwashing cycles. Upon completing a backwashing cycle, the finer and heavier material will settle first followed by less rapid settling of the coarser but lighter material. Generally, such mixed-media in-depth filters utilize anthracite for the coarse grained filter media and sand for the finer filter media. Other combinations have also been proposed, e.g., sand and garnet, slag and sand.

To properly separate surface loading contaminants from the larger granular filter media in mixed-media filters, it is necessary to agitate and slurry the larger filter media in a turbulent manner. A critical deficiency in previous mixed-media in-depth filters, including that disclosed in U.S. Pat. No. 3,276,585, is the absence of a turbulent or violent backwash of the larger filter media. The mere expansion of the typical mixed-media deep bed filter upon backwash (utilized by all the known prior art filters of this type, including that of U.S. Pat. No. 3,276,585) is not sufficient to adequately dislodge or separate the contaminants from the larger filter media.

In addition, a decided improvement in filtration efficiency can be realized by utilizing the gradation of granules that occurs in the bed of finer filter media after repeated backwashings.

A prime object of the present invention is to provide a mixed-media deep bed filter method which adequately separates entrapped contaminants from the coarse grain filter media and which operates efficiently after repeated backwashing, while fully utilizing the gradation of the finer filter media.

BRIEF DESCRIPTION OF INVENTION

The present invention proposes to overcome the difficulties encountered with conventional mixed-media in-depth filter apparatus by utilizing a dual media filter bed of uncommon combination, graded or classified from coarser to finer media as in a conventional filter. The finer filter media can consist of any standard material such as sand, garnet, slag or the like provided the specific gravity of the media is greater than 2.1. The larger granule filter media may be any material (1) which has a specific gravity of from 0.9 to 1.6, (2) which exhibits adequate filtration properties, and (3) which is tough and resilient. Exemplary of such media are polyvinyl chloride, polyethylene, and polypropylene.

During filtration, all of the dirty liquid is passed through the bed of larger media. After passage through the larger media, a first substantial portion of the dirty liquid is withdrawn for flow upwardly through the bed of finer filter media, this flow being in the direction of large to smaller filter media granules and resulting in the most effective filtration flow. Simultaneously, the second and remaining portion of the dirty liquid, also earlier partially filtered by the larger media, passes directly into the bed of fine filter media for the purpose of holding the lower filter bed in a fixed position. The two portions of the liquid flow vertically toward one another to and through a common outlet. The prior art U.S. Pat. No. 3,335,868 discloses double direction flow during the filtration cycle from a lower, larger media bed to a pair of superimposed upper, fine media beds.

In the present invention a novel backwashing technique is utilized. Upon backwashing of the filter media bed, the lower bed of finer and heavier material is merely expanded upwardly in a conventional manner, while the upper bed of larger and lighter filter media is expanded and slurried in a turbulent manner through a recirculating path at least a part of which is external of the filter media vessel. The resultant violent backwash dislodges entrapped surface loading contaminants from the coarse grained media and also removes finer dirt particles washed upwardly from the lower bed into the upper slurry. The vertical orientation of the differing media allows the filter bed to reform after backwashing to its original gradation. This backwashing technique could not be utilized in the reversely arranged coarse and fine media beds of U.S. Pat. No. 3,335,868.

AS SHOWN ON THE DRAWINGS

Figure 1:
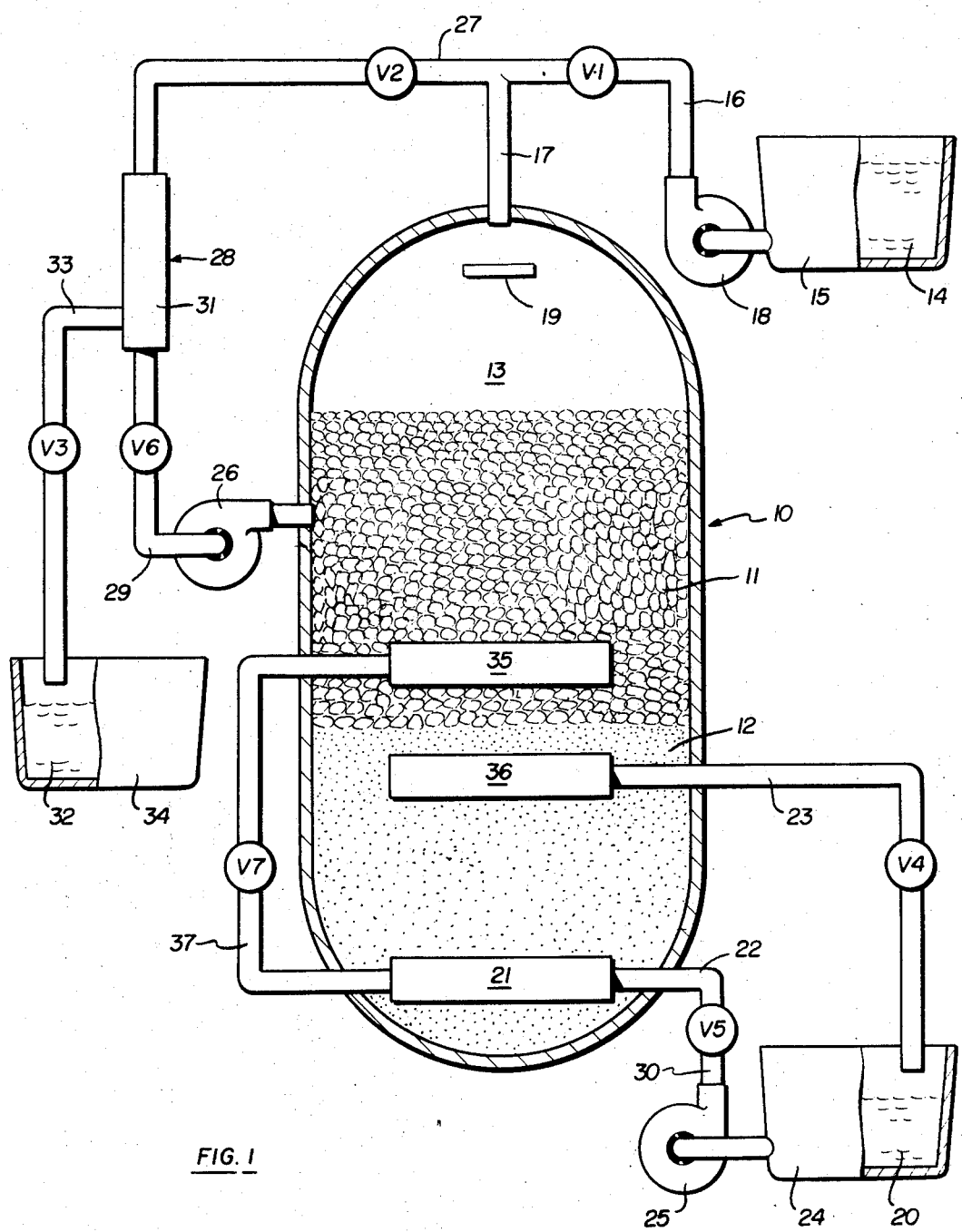
FIG. 1 is a schematic elevational, cross-sectional view of a filter of the present invention utilizing the method of this invention.
Figure 2:
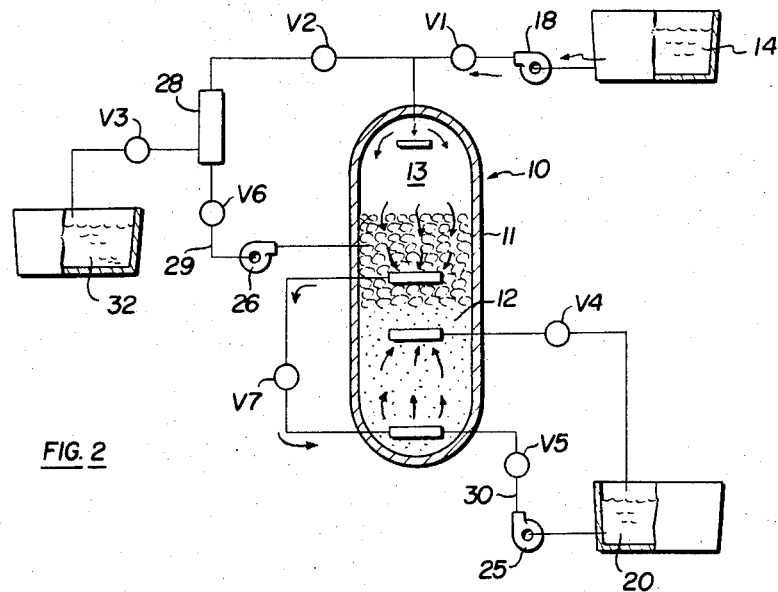
FIGS. 2 and 3 are simplified elevational, cross-sectional, schematic views of the present invention showing liquid flow paths during filtration and backwash and slurry, respectively.
Figure 3:
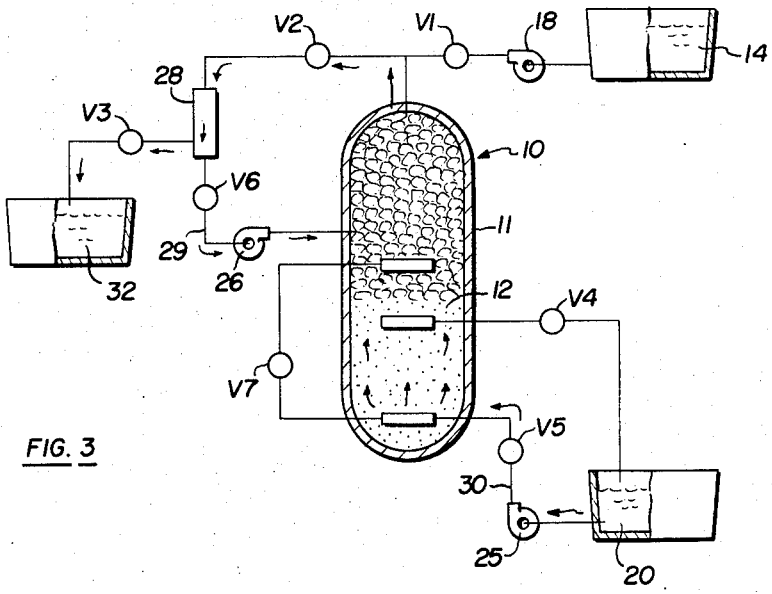

As shown in FIGS. 1, 2, and 3, pressure vessel 10 houses two distinct, vertically adjacent beds of filter media 11 and 12. The lower filter media bed 12 is comprised of any relatively fine granular material having a specific gravity greater than 2.1 and exhibiting ordinary filtration qualities. In its preferred embodiment filter media bed 12 consists of washed sand having a specific gravity of 2.74. Other acceptable materials include garnet, sand, and crushed gravel. As will be obvious from a later explanation, it is not necessary that the grain size of the material be uniform, and is preferable that some degree of non-uniformity exist. The gradation of the material that is inherent in natural material and that inevitably occurs from inter-particle abrasion after repeated backwashings is used to full advantage by the method of the present invention.

The upper filter media 11 is comprised of relatively large granules falling into the size range of from 0.050 inches to 0.375 inches, with the preferred size being about 0.140 inches. To avoid an accumulation of smaller particles at the surface of bed 11, the granular size must be fairly uniform. The specific gravity of the material must not be less than 0.9 and not greater than 1.6. It must be comprised of a tough, resilient material to withstand the turbulent slurrying action during the backwash cycle. In preferred embodiment filter media 11 consists of glass filled polyethylene or polypropylene spherical or cylindrical beads; though polyvinyl chloride and crushed Black Walnut Shells are also satisfactory. Unfilled polyethylene or polypropylene are also satisfactory. Though these materials have a specific gravity of less than water, the dynamic pressure created during filtration will cause the upper bed to assume a fixed position against lower filter media 12.

As will be explained in more detail, during the backwash cycle, the upper filter media 11 will be expanded and slurried through a recirculating path which is partly external of vessel 10, while the lower filter media bed 12 will be expanded only. The unfilled head space 13 in the tank 10 above the upper bed 11 must be of sufficient volume to permit adequate slurrying of filter bed 11 in addition to accommodating expansion of filter bed 12.

During the filtration cycle, the present invention operates to utilize to the fullest extent the increased filtration efficiency resulting from filtration flow in the direction of large to smaller filter media granules. The dirty liquid 14, contaminated with particulate matter, is pumped from its source 15 through line 16, valve V–1, and line 17 into the vessel or tank 10 by means of pump 18. Upon entering vessel 10, liquid 14 is distributed by means of splash plate 19 and passes through filter media 11.

The liquid in the media is split into two fractions or portions. A first substantial portion of the liquid passes into perforate tube 35, which in the preferred embodiment is standard slotted wedgewire well screen pipe, this tube 35 being embedded in the media 11 well below the exposed upper surface of the bed. The partially filtered liquid then passes into and through line 37, valve V–7, and perforate tube 21 for entry into filter media 12. The second or remaining portion of the liquid not flowing into perforate tube 35 passes downward and directly into filter media 12.

The composition of liquid 14 would in most instances be best represented by municipal or industrial waste water containing greases, oils, flakes, hydroxides, pulp, hair, fibrous and lint-like surface loading contaminants. And in such instances, the dual media composition of the present invention is necessary to ensure removal of surface loading contaminants prior to contact of the contaminated liquid with relatively fine filter media 12. The relatively large size or coarseness of the granules of filter bed 11 allows surface loading contaminants to penetrate the surface of bed 11 to become entrapped between the granules. In the absence of filter media 11, any surface loading contaminants would quickly blind off filter media 12 and prevent effective in-depth filtration and would require frequent backwashings, yielding an overall inefficient operation.

Upon entering filter 12 whether (1) from perforate tube 21 or (2) directly from the top of the bed of filter media 12, the partially filtered contaminated liquid permeates through media 12 into a common perforate outlet tube 36 which, in the preferred embodiment like tubes 35 and 21, is standard slotted wedgewire well screen pipe. The two above defined fractions of partially filtered liquid flow vertically through the lower, fine media bed 12 in opposite directions to finally merge into a single stream of filtered liquid flowing through the single outlet 36.

To alter the distribution of liquid at perforate tube 21, the immediate area about the tube can be packed with large sized gravel, or a multi-outlet distribution header can be substituted for the tube 21.

Few compositions of granular filter material are perfectly uniform in size, and the kind of material which makes up filter media 12 is no exception. Further, abrasion during backwashing is non-uniform. As a result of the initial filling operation and repeated backwashings, the finer material of filter media 12 will tend to accumulate at the interface of filter media 11 and 12. The granules will become coarser toward the lower reaches of the bed of filter media.

Rather than filtering all of the flow straight through filter media 11 and 12 as in a conventional multi-media filter, the method of the present invention intercepts (at tube 35) a substantial part of the partially filtered liquid after it has passed through filter media 11, and this liquid is directed through filter media 12 from coarse to fine filter media granules. This lengthens the filter cycle for filter media 12 and improves filtration efficiency by allowing deeper penetration of particulate contaminants into the bed of media.

As previously stated, the remainder of the dirty liquid (that portion not intercepted by the tube 35) flows directly downwardly through the filter media 11, 12 to perforate tube 36. However, this liquid necessarily flows through a high resistance path, as it must flow through the finest granules of filter media which accumulate at the top of the bed of filter media 12. These very fine filter media granules will effectively entrap any particulate contaminates in liquid 14, and the surface of the lower bed 12 will soon blind off to impede vertically downward liquid flow. As a result, the directly downwardly flow of liquid has a minimal effect on the overall operation of the filter, except to the extent that it maintains a net downward pressure to hold bed 12 in place while substantial upward flow from the tube 21 continues.

The filtered liquid, designated 20, after passing into perforate tube 36, passes into and through line 23 and valve V-4, and finally into tank 24 from which filtered liquid will be distributed for latter use or use in backwashing filter media 11 and 12. Throughout the filtration cycle valves V-2, V-3, V-5, and V-6 remain closed.

The backwash cycle is initiated after the filtration cycle upon either a predetermined pressure differential across the filter media bed or upon a preset level of turbidity in filtered liquid 20, or it may be based simply on passage of time or total filtered flow. In any event, upon initiation of the backwash cycle, valves V-1, V-3, V-4, and V-7 are closed, and pump 18 is stopped. Valves V-2, V-5 and V-6 are opened and pumps 25 and 26 are started.

The filter beds of conventional mixed-media deep bed filters are backwashed in a manner which provides only an expansion of the beds and a relatively slight agitation to dislodge entrapped dirt particles. This backwashing technique is adequate for cleansing a bed of finer media of its nonsurface loading contaminants. But proper and more complete separation of surface loading contaminants from the more coarse filter media requires violent agitation and complete slurrying of the filter media. This is particularly necessary for greases, oils and fibrous contaminants, which tend to strongly adhere to the filter media.

The backwash flow rate of filtered liquid 20 through filter media bed 12 is sufficient to expand the dense, lower filter media bed 12. This expansion allows entrapped solids to remove themselves from the interstices of the filter bed and to be washed upwardly through the lower bed 12. Generally, this would be at an upflow rate of 10 to 15 gallons per minute per square foot of horizontal filter bed area. The expansion of bed 12 and cleansing action of the backwashing filtered liquid 20 flushes contaminants upwardly toward and into the upper bed 11. These contaminants, but not lower filter media bed 12, are then slurried and removed jointly with the contaminants in the upper bed 12, as hereafter described.

During the backwash cycle, filter media bed 11 is expanded and slurried through a path which produces turbulent agitation. This turbulent agitation is a critical part of the present invention and is the basis for requiring the composition of filter media bed 11 to be of a tough and resilient material such as glass filled polyethylene or polypropylene. The turbulent action is necessary to ensure separation of surface loading contaminants from the granules of filter media 11.

At the outset of the backwash cycle, filter media bed 11, the contaminants therein, and the contaminants flushed upwardly from bed 12 are expanded and recirculated through a recirculation path which does not intersect expanded bed 12. The media, suspended in backwash liquid, flows through lines 17 and 27, valve V-2, draw-off device 28, valve V-6, line 29, pump 26 and back into vessel 10, while contaminants are drawn off at draw-off device 28 located in the recirculation path. The turbulent flow produced through the lines external of vessel 10 produce sufficiently violent action to adequately cleanse the filter media bed 11 of the contaminants, including greases, oils, hydroxides, fibers, line, particulate particles, and the like.

After a period of time has elapsed permitting bed 11 to sufficiently agitate, valve V-3 is opened. With pump 25 having been started, there is a flow of filtered liquid 20 through line 30, valve V-5, line 22, perforate tube 21 and into filter media 12. An equal amount of flow of backwash liquid 32 is withdrawn from the tank 10 through lines 17 and 27, and passes through perforate tube 31 into draw-off device 28 and through line 33 into tank 34 for disposal or further treatment. Backwash liquid 32 contains a concentration of particulate contaminants which have been cleansed from the filter bed. A detailed explanation of draw-off device 28 can be found in my U.S. Pat. No. 3,550,774.

The backwash cycle is continued until sufficient entrapped particulate contaminants have been removed from the slurry of contaminants, backwash liquid and filter media. Upon terminating the backwash cycle, pumps 25 and 26 are stopped and valves V-2, V-3, V-5 and V-6 are closed. The granules of filter media then immediately settle into their respective positions at beds 11 and 12. A distinct separation or classification of the two different filter media takes place as a result of the different specific gravities of the filter materials. The heavier and finer filter media will settle first followed by less rapid settlings of the coarser material. The fact that filter beds 11 and 12 do not intermix during the backwashing cycle also aids in maintenance of distinctly separate beds. If bed 11 is composed of lighter than water material such as unfilled polyethylene or polypropylene, bed 11 will float until filtration flow is again resumed, thus maintaining an obvious separation of filter beds.

After the backwashing cycle, it may be desirable to purge backwash device 28 and lines 17, 27 and 29 of filter media. Such a purge is not a part of the present invention, and for the sake of simplification, piping and other appurtenances necessary to carry out the purge are not shown.

The sequence of operation of the present invention is shown in the simplified schematics of FIGS. 2 and 3. In FIG. 2, operation of the filtration cycle is depicted with the arrows showing the flow path of the contaminated liquid through the filter media beds. The backwash cycle with expansion of filter media bed 12 and slurrying of filter media bed 11 is shown in FIG. 3, again with arrows indicating the respective flow paths.

The foregoing disclosure dealt with a pressure filter vessel which is the preferred embodiment of the present invention because of the greater filtration flow rates developed with pressure filtration. However, it should be understood that the present invention is applicable equally to standard gravity filters.

Having fully explained an operative embodiment of the present invention, I now claim:

1. In a method of operating and regenerating a filter, said filter including a vessel housing a lower, distinct filter media layer in direct contact with an upper, distinct filter media layer, said lower filter layer consisting essentially of a granular material having a substantially uniform specific gravity greater than about 2.1, said upper filter bed consisting essentially of a resilient, durable granular material of a substantially uniform specific gravity in the range of about 0.9 to 1.6 and in a size range of about 0.050 to 0.375 inches, the granular materials of said upper and lower layers being selected so that the layers remain essentially discrete after backwashing, and said upper layer granular material being resilient and durable to maintain its granular size and integrity upon backwashing, a contaminated liquid inlet at an upper portion of said vessel, a filtered liquid outlet embedded within and spaced between the upper and lower extremities of said lower layer, an interception element embedded within said upper layer, a re-entry element vertically spaced beneath said liquid outlet, said interception and reentry elements in fluid communication by a connecting conduit, a circulation means including (a) a conduit exterior to and communicating with said vessel at first and second locations, said second location being generally at the side of the vessel between the upper and lower surfaces of the upper filter media during backwashing, and said first location being generally at an upper portion of said vessel above said upper filter media, (b) a draw-off device, and separating means in said device for removing contaminants and a portion of the backwash liquid from the slurry, being circulated through said circulation means and (c) a pump in said circulation conduit, comprising the steps of: (1) flowing contaminated liquid into said upper filter layer downwardly through said liquid inlet; (2) removing only a portion of the contaminants as the liquid flows through said upper layer to the location of the interception element to provide partially filtered liquid at said location; (3) intercepting at least a portion of said partially filtered liquid by said interception element to reduce accumulation of contaminants at the interface between the upper and lower filter layers; (4) flowing said intercepted liquid into the lower filter layer through said re-entry element to the outlet, thereby generating a vertically upward flow within said lower layer; (5) flowing the non-intercepted, partially filtered liquid downwardly into said lower filter layer to the outlet; (6) removing through said outlet filtered liquid flowing both upwardly and downwardly to said outlet; (7) terminating said flow when at least one of said filters layers becomes at least partially clogged with particulate contaminants; (8) introducing backwash liquid into a lower portion of said filter vessel at a flow rate (a) sufficient to expand the lower filter media layer and flush at least some of the accumulated contaminants therein upwardly into the upper filter layer, and (b) the backwash flow rate being insufficient either to intermix the lower media layer with the upper media layer or to expand said lower media layer to said second location; (9) energizing the circulation pump to assist in forming a slurry comprised of the upper media layer, the contaminants accumulated in said upper layer, and the contaminants flushed upwardly from said lower media layer; (10) flowing said slurry (a) out of the vessel through said first location, and (b) through said circulation means, separating at least a portion of said contaminants from said slurry in said separating means to at least partially cleanse said slurry; (11) flowing the cleansed slurry back into the vessel through the second location, to further assist in slurrying and circulating the upper layer and any contaminants; and (12) terminating said slurry circulation flow and the introduction of said backwash flow and reforming said upper and lower media layers.

2. The method defined in claim 1, characterized in that steps (2), (3), (4), (5) and (6) occur simultaneously.

3. The method defined in claim 1, characterized by the backwash liquid being introduced into said vessel through said re-entry element.

4. The method defined in claim 1, characterized by a single opening defining the contaminated liquid inlet and the first communication location of said circulation conduit.

* * * * *